(12) United States Patent
Ha et al.

(10) Patent No.: US 9,745,490 B2
(45) Date of Patent: Aug. 29, 2017

(54) PVC-BASED METALLOPOLYMER NANOCOMPOSITES, AND COATING COMPOSITION AND COATING FILM COMPRISING SAME

(71) Applicant: Pusan National University Industry-University Cooperation Foundation, Busan (KR)

(72) Inventors: Chang Sik Ha, Busan (KR); Saravanan Nagappan, Busan (KR); Jin Joo Park, Busan (KR)

(73) Assignee: Pusan National University Industry—University Cooperation Foundation (KR)

( * ) Notice: Subject to any disclaimer, the term of this patent is extended or adjusted under 35 U.S.C. 154(b) by 396 days.

(21) Appl. No.: 14/422,050

(22) PCT Filed: Aug. 22, 2013

(86) PCT No.: PCT/KR2013/007535
§ 371 (c)(1),
(2) Date: Feb. 17, 2015

(87) PCT Pub. No.: WO2014/030940
PCT Pub. Date: Feb. 27, 2014

(65) Prior Publication Data
US 2015/0247051 A1    Sep. 3, 2015

(30) Foreign Application Priority Data
Aug. 22, 2012  (KR) .................. 10-2012-0092005

(51) Int. Cl.
| C09D 127/06 | (2006.01) |
| C09D 127/22 | (2006.01) |
| C08K 5/37 | (2006.01) |
| C09D 5/16 | (2006.01) |

(52) U.S. Cl.
CPC .............. *C09D 127/06* (2013.01); *C08K 5/37* (2013.01); *C09D 5/1637* (2013.01); *C09D 5/1681* (2013.01); *C09D 127/22* (2013.01); *Y10T 428/24628* (2015.01); *Y10T 428/31507* (2015.04); *Y10T 428/31511* (2015.04); *Y10T 428/31544* (2015.04); *Y10T 428/31598* (2015.04); *Y10T 428/31663* (2015.04)

(58) Field of Classification Search
CPC .. C09D 127/06; C09D 5/1637; C09D 5/1681; C09D 127/22; C08K 5/37; Y10T 428/24628; Y10T 428/31507; Y10T 428/31511; Y10T 428/31544; Y10T 428/31598; Y10T 428/31663
See application file for complete search history.

(56) References Cited

U.S. PATENT DOCUMENTS

| 4,613,653 A * | 9/1986 | Kitchens et al. .... C08G 85/004 525/330.4 |
| 4,767,804 A * | 8/1988 | Willoughby ............ C08C 19/30 523/200 |
| 7,524,535 B2 | 4/2009 | Kim et al. |
| 7,553,897 B2 | 6/2009 | Starnes, Jr. |
| 2001/0036987 A1 | 11/2001 | Beekman et al. |
| 2007/0248678 A1 | 10/2007 | Woo et al. |

OTHER PUBLICATIONS

International Search Report for PCT/KR2013/007535, dated Dec. 27, 2013, 2 pages.

* cited by examiner

*Primary Examiner* — Nathan M Nutter
(74) *Attorney, Agent, or Firm* — Ware, Fressola, Maguire & Barber LLP

(57) ABSTRACT

The present invention relates to a PVC-based metallopolymer nanocomposite. The PVC-based metallopolymer nanocomposite includes a core-forming metal ion, a nucleophilic thiol having three mercapto functional groups, and poly (vinyl chloride) (PVC). The present invention also relates to a metallopolymer nanocomposite surface modified with silica that is prepared by grafting the PVC-based metallopolymer nanocomposite with a silane compound.

20 Claims, 15 Drawing Sheets

[Fig. 1]
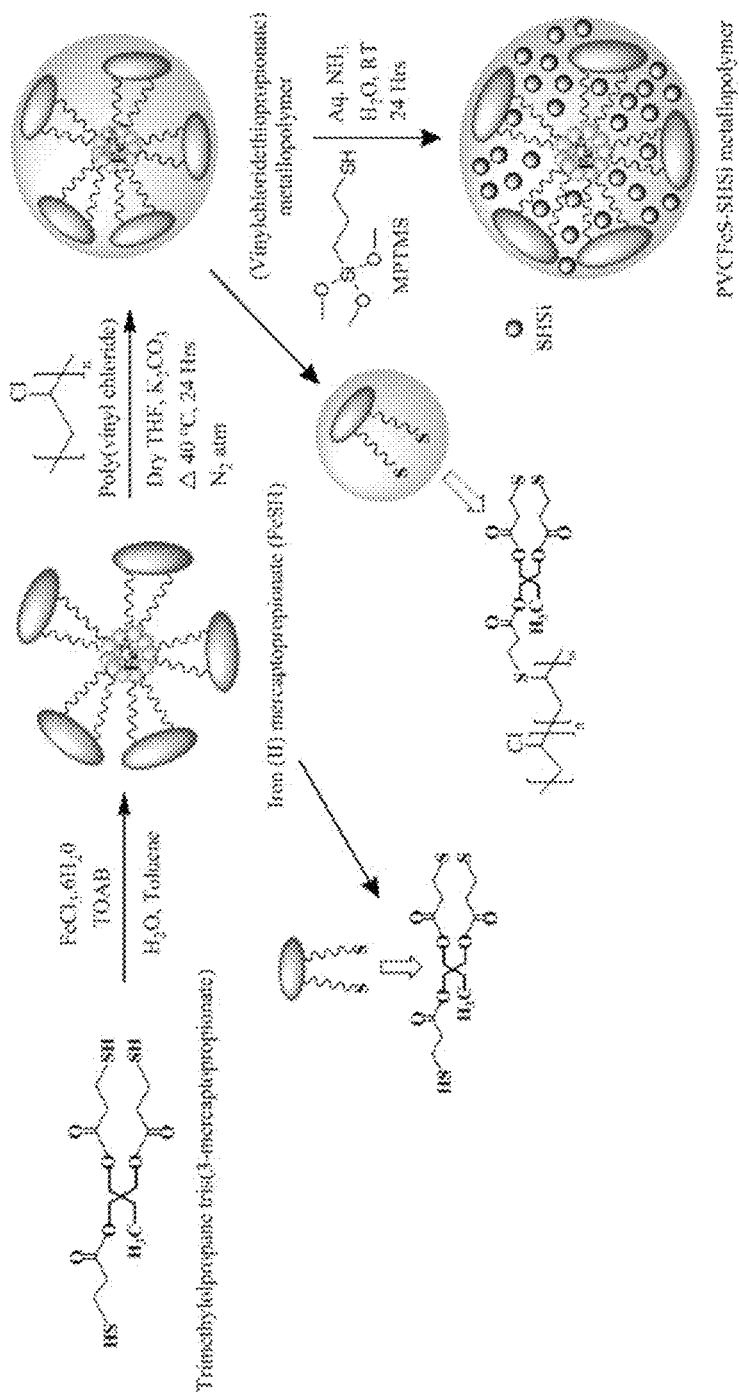

[Fig. 2]
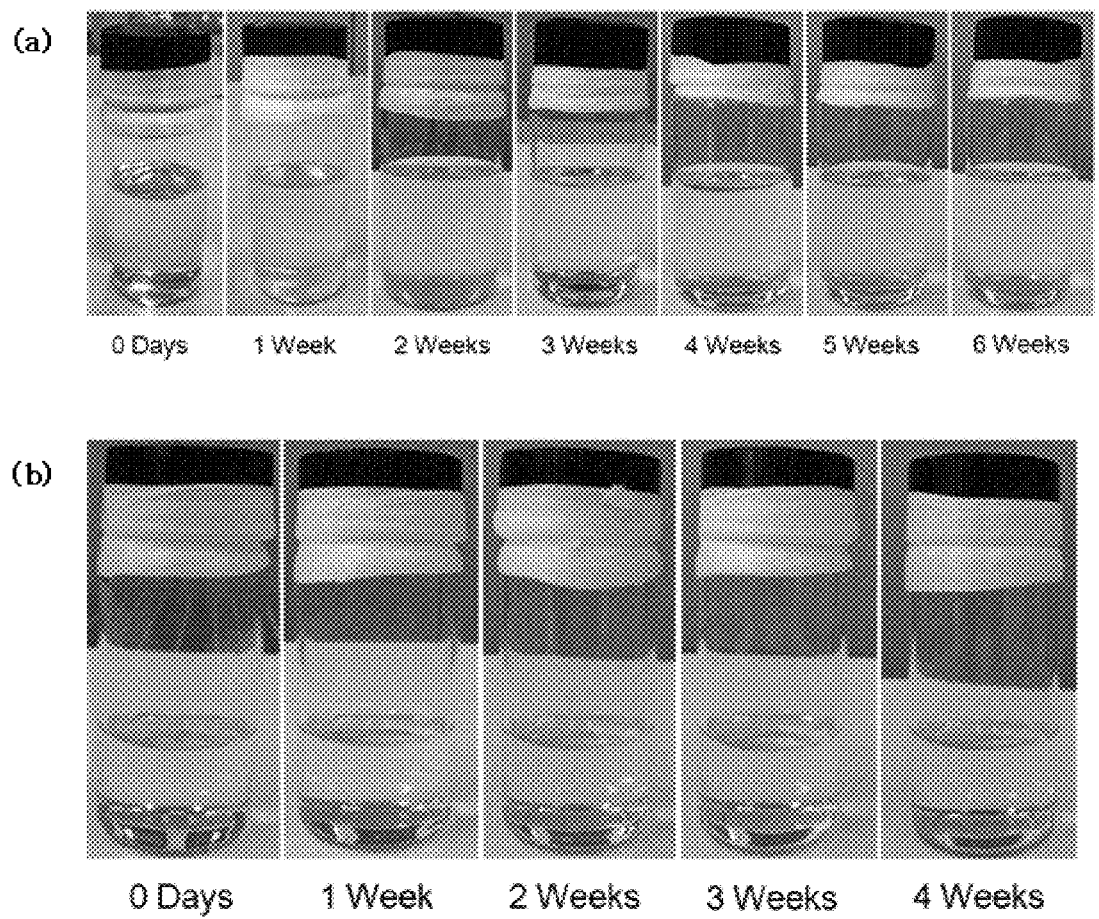

[Fig. 3]
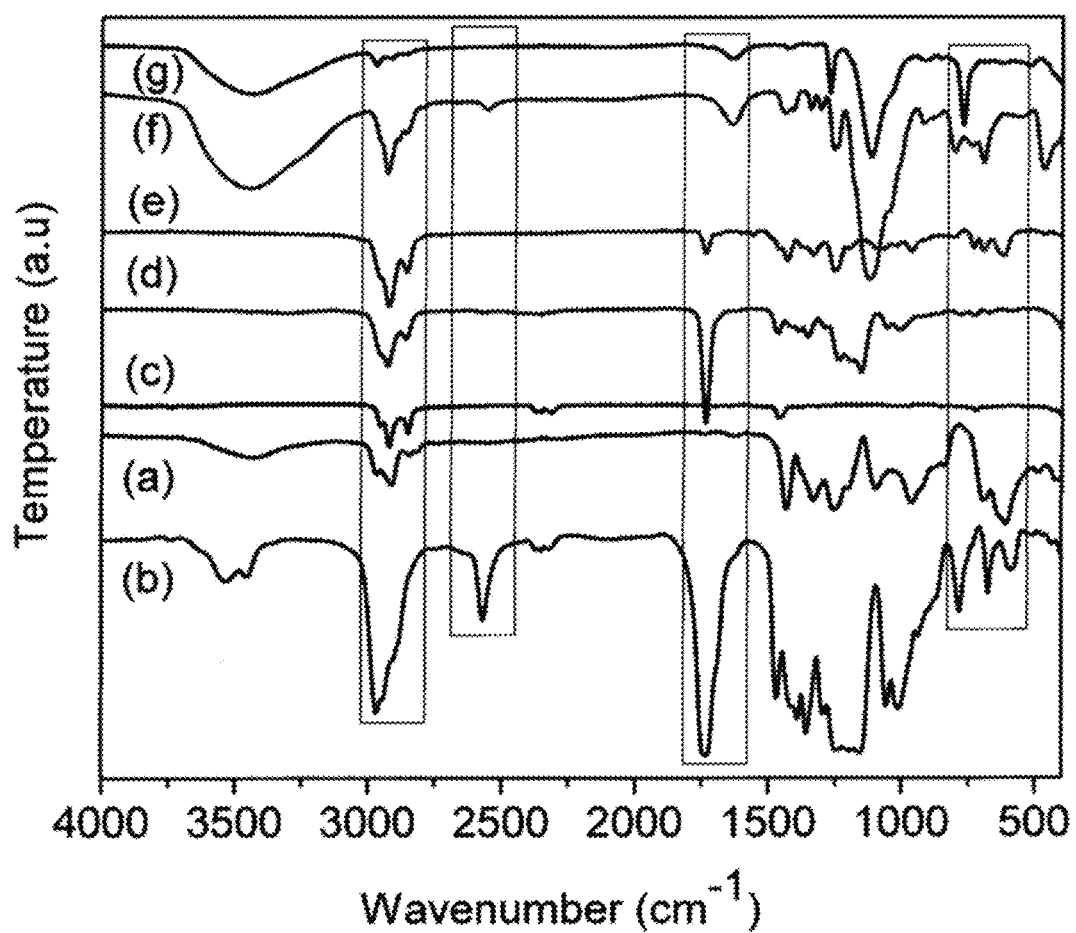

[Fig. 4]
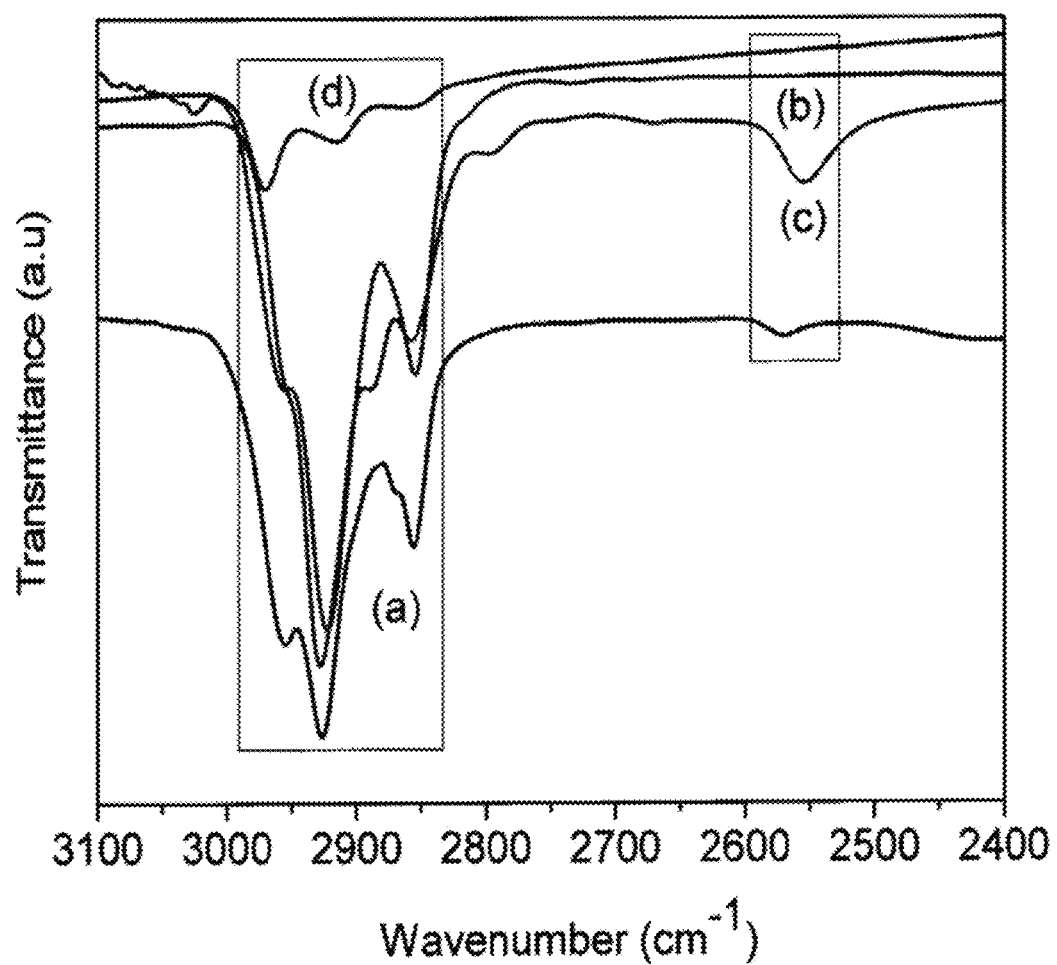

[Fig. 5]
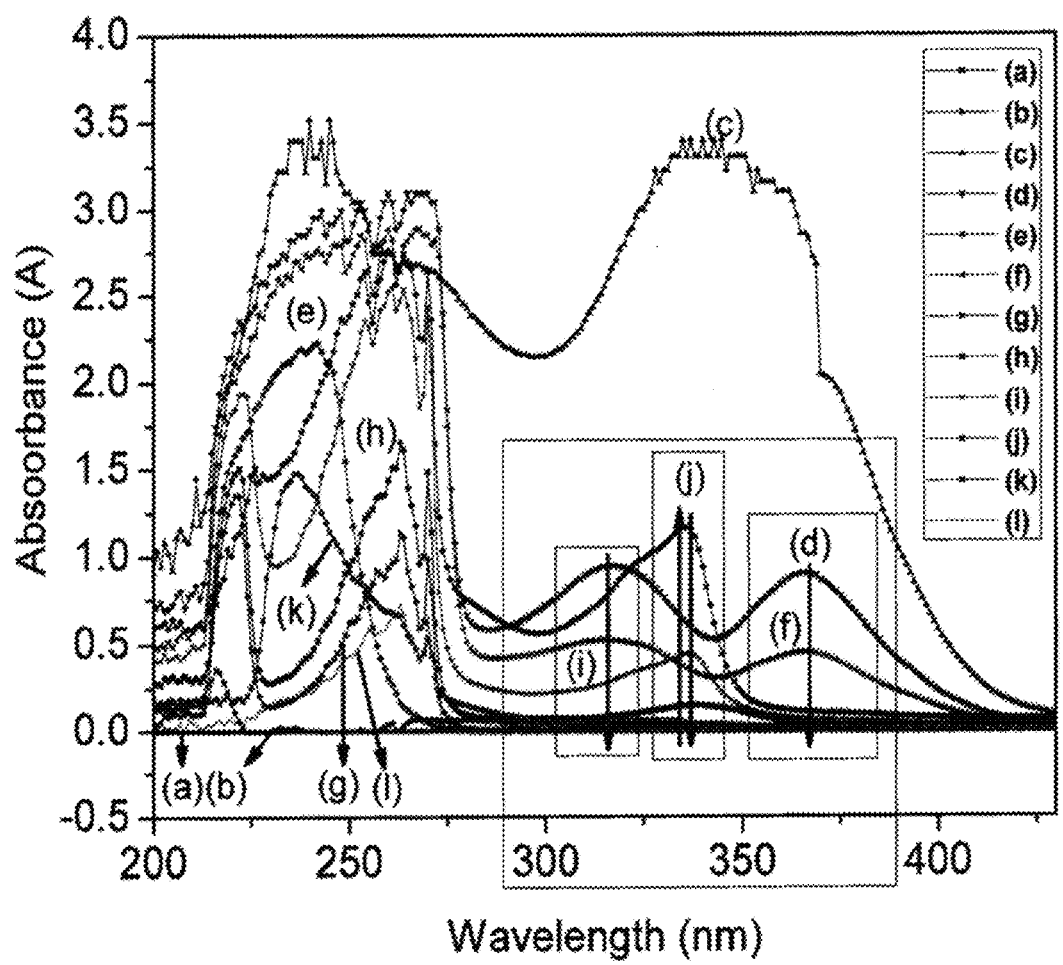

[Fig. 6]
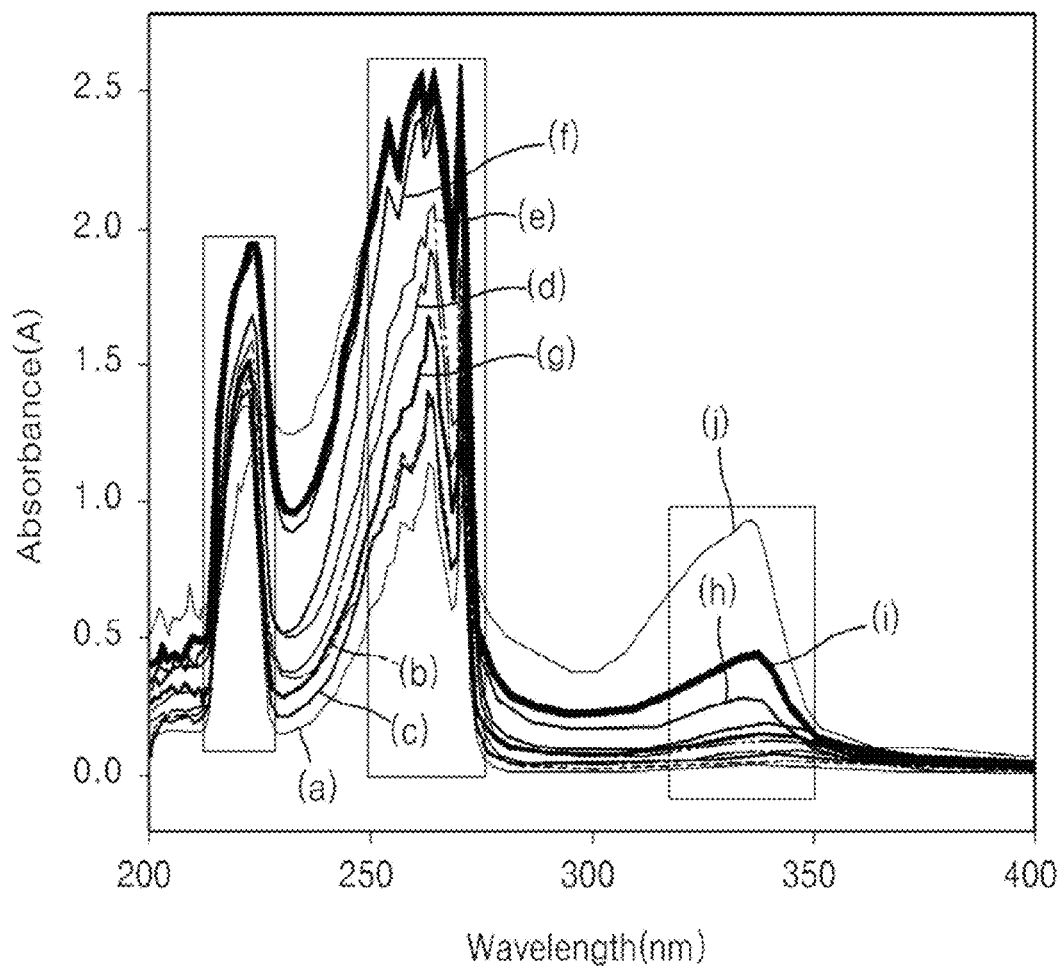

[Fig. 7]
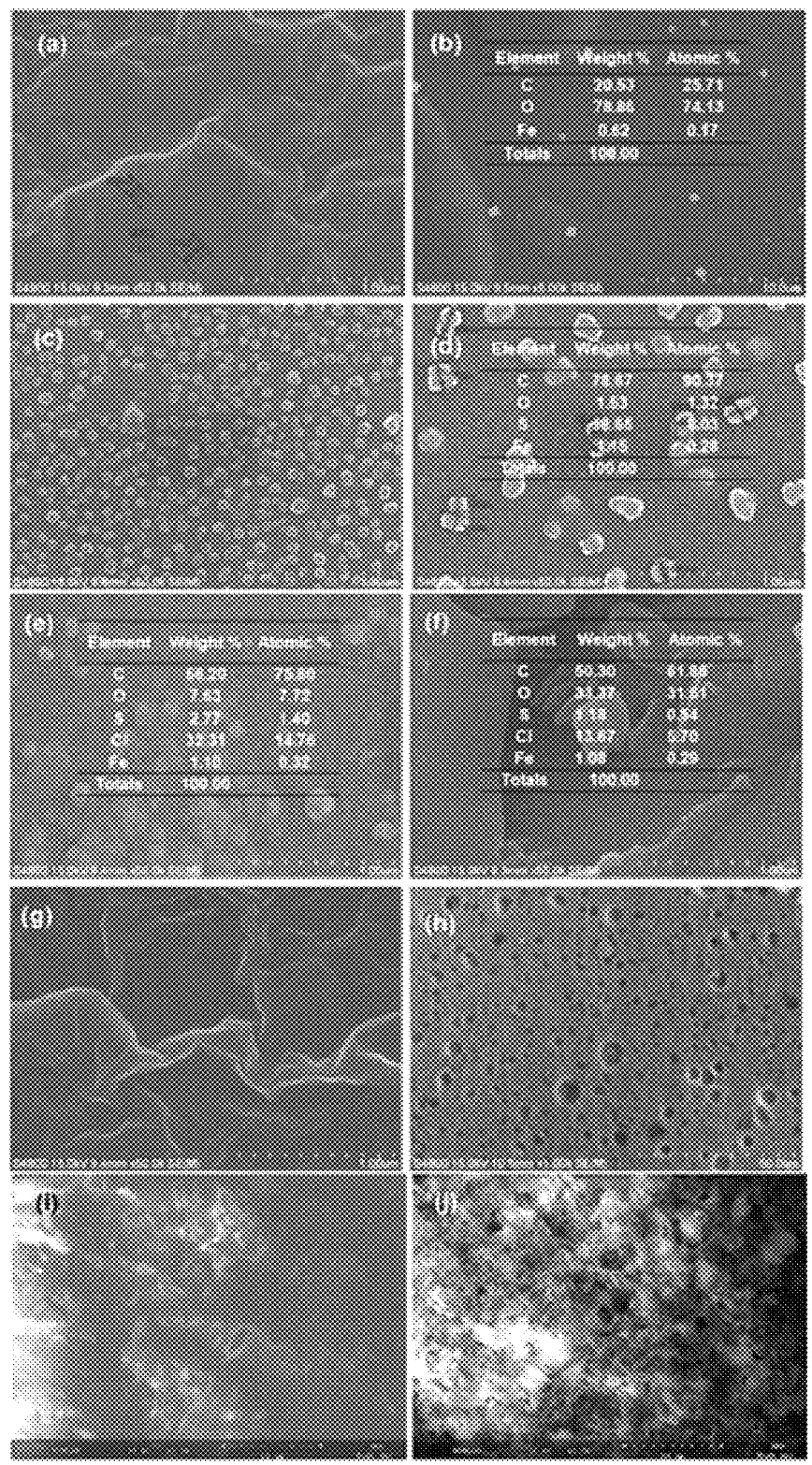

[Fig. 8]
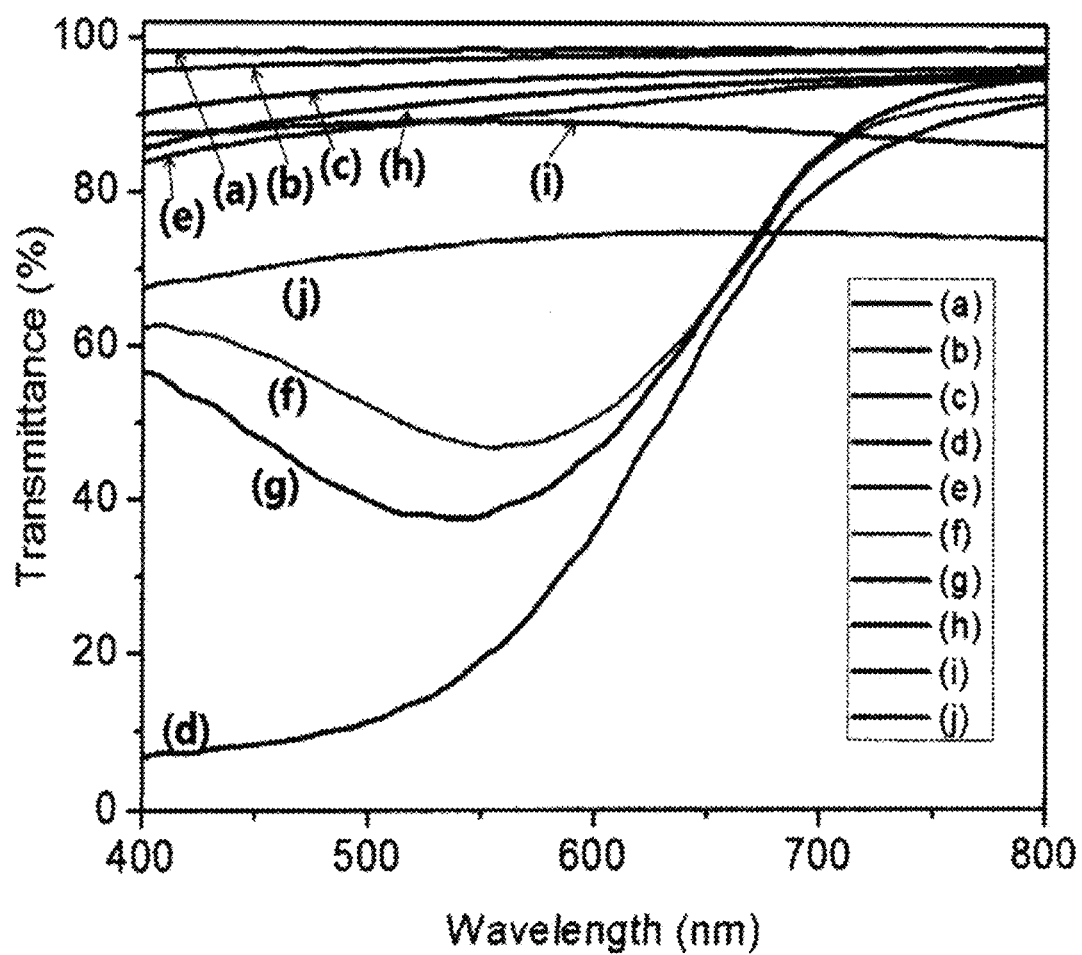

[Fig. 9]
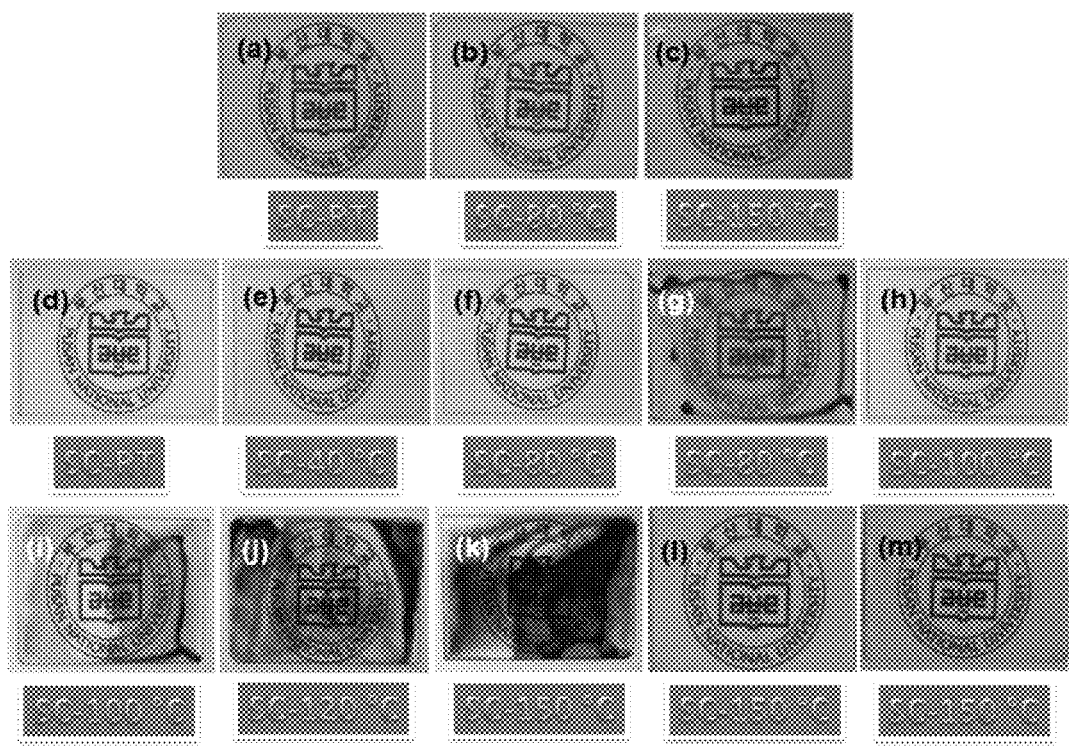

[Fig. 10]
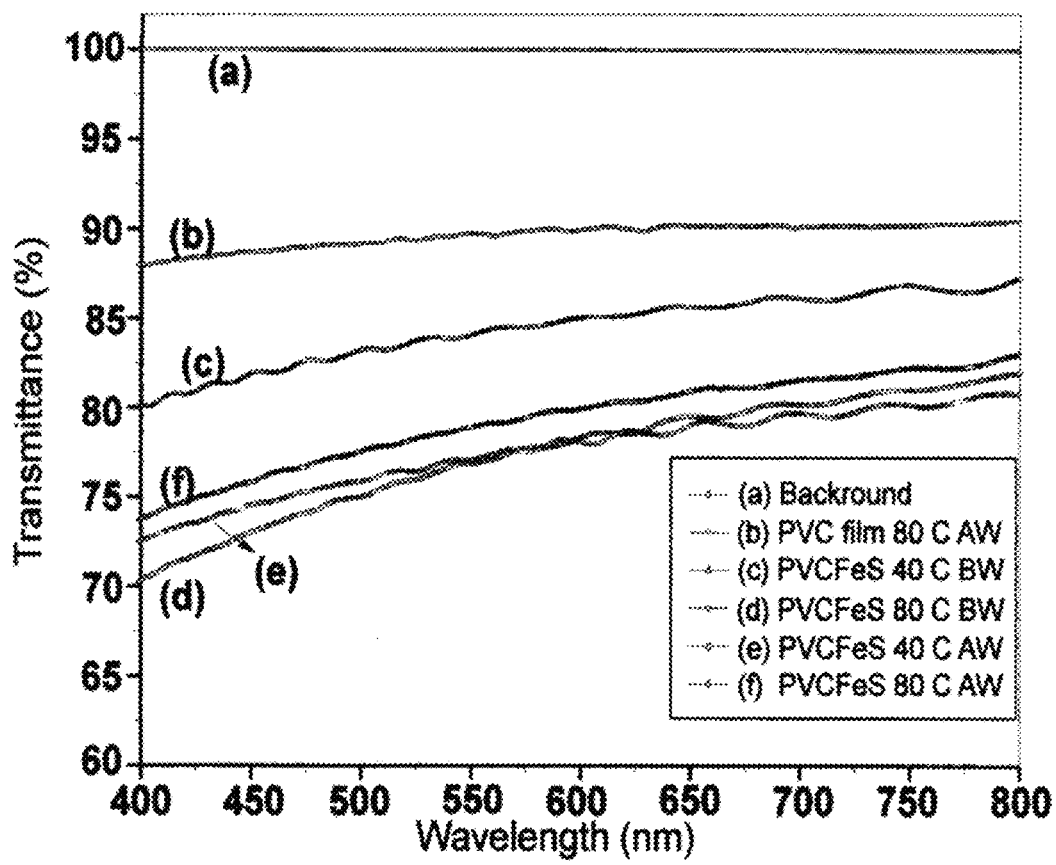

[Fig. 11]
| Sample | SCA for water (degree) | | SCA for MI (degree) | |
|---|---|---|---|---|
| Curing Temp. (°C) | 80 °C | 150 °C | 80 °C | 150 °C |
| PVC | 111.12 ± 6.0 | 107.26 ± 2.0 | 51.80 ± 2.0 | 55.53 ± 1.0 |
| TMSH | - | 62.84 ± 3.0 | - | 47.15 ± 2.0 |
| Fe (III) in Toluene | 84.90 ± 2.0 | 85.66 ± 2.0 | 29.90 ± 3.0 | 67.63 ± 2.5 |
| FeSH | 93.90 ± 2.0 | 82.23 ± 3.0 | 17.13 ± 1.0 | 57.94 ± 2.5 |
| PVCFeS | 142.65 ± 3.0 | 143.27 ± 2.0 | 120.87 ± 2.2 | 138.50 ± 3.0 |
| PVCFeS-SHSi | 113.98 ± 1.0 | 112.20 ± 1.0 | 56.33 ± 2.0 | 61.20 ± 3.5 |
| PVCFeS-MeSi | 116.53 ± 0.5 | 116.10 ± 2.0 | 80.77 ± 1.5 | 85.27 ± 2.0 |
[Fig. 12]
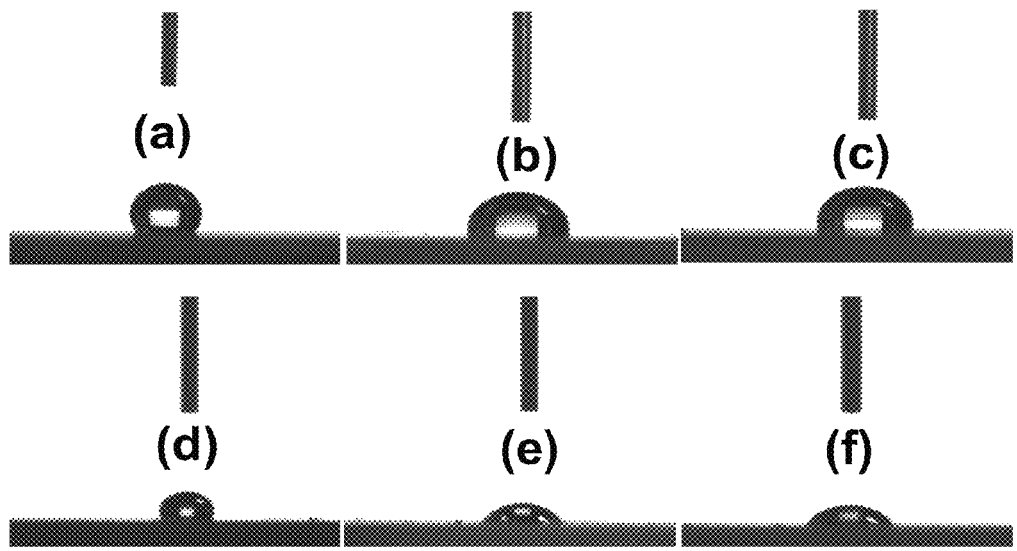

[Fig. 13]

| Sample | SCA for water (degree) | |
|---|---|---|
| Curing Temp. (°C) | 40 °C | 80 °C |
| PVC | - | 107.27 ± 1.0 |
| PVCFeS (before washing with distilled water) | 105.40 ± 2.0 | 112.30 ± 3.0 |
| PVCFeS (after washing with distilled water) | 105.38 ± 2.0 | 100.33 ± 4.0 |

[Fig. 14]

| Sample (phr) | SCA for water (degree) | | SCA for soybean oil (degree) | |
|---|---|---|---|---|
| Curing Temperature | 80 °C | 150 °C | 80 °C | 150 °C |
| PVCFeS | 142.65 ± 3.0 | 143.27 ± 2.0 | 66.10 ± 4.0 | 105.03 ± 3.0 |
| PVCFeS in THF (0.00) | 82.43 ± 1.5 | 76.27 ± 3.8 | 42.40 ± 1.0 | 44.50 ± 1.0 |
| PVCFeS-SHSi (0.01) | 113.58 ± 0.5 | 111.73 ± 1.0 | 63.60 ± 2.5 | 64.40 ± 1.5 |
| PVCFeS-SHSi (0.05) | 113.98 ± 1.0 | 112.20 ± 1.0 | 53.90 ± 2.0 | 57.40 ± 0.5 |
| PVCFeS-SHSi (0.10) | 115.05 ± 1.4 | 112.87 ± 1.5 | 43.90 ± 1.0 | 44.70 ± 1.5 |
| PVCFeS-SHSi (0.20) | 118.16 ± 2.0 | 116.27 ± 4.0 | 60.60 ± 0.5 | 62.50 ± 1.0 |
| PVCFeS in THF (0.00) | 82.43 ± 1.5 | 76.27 ± 3.8 | 42.40 ± 1.0 | 44.50 ± 2.0 |
| PVCFeS-MeSi (0.01) | 116.53 ± 0.5 | 116.10 ± 0.5 | 69.60 ± 0.5 | 76.20 ± 1.0 |
| PVCFeS-MeSi (0.05) | 116.37 ± 0.5 | 115.27 ± 1.0 | 67.50 ± 1.0 | 74.60 ± 1.0 |
| PVCFeS-MeSi (0.10) | 113.23 ± 1.0 | 111.87 ± 2.8 | 66.00 ± 0.5 | 67.80 ± 0.5 |
| PVCFeS-MeSi (0.20) | 86.87 ± 1.5 | 110.73 ± 2.0 | 43.00 ± 3.0 | 48.00 ± 2.0 |

[Fig. 15]
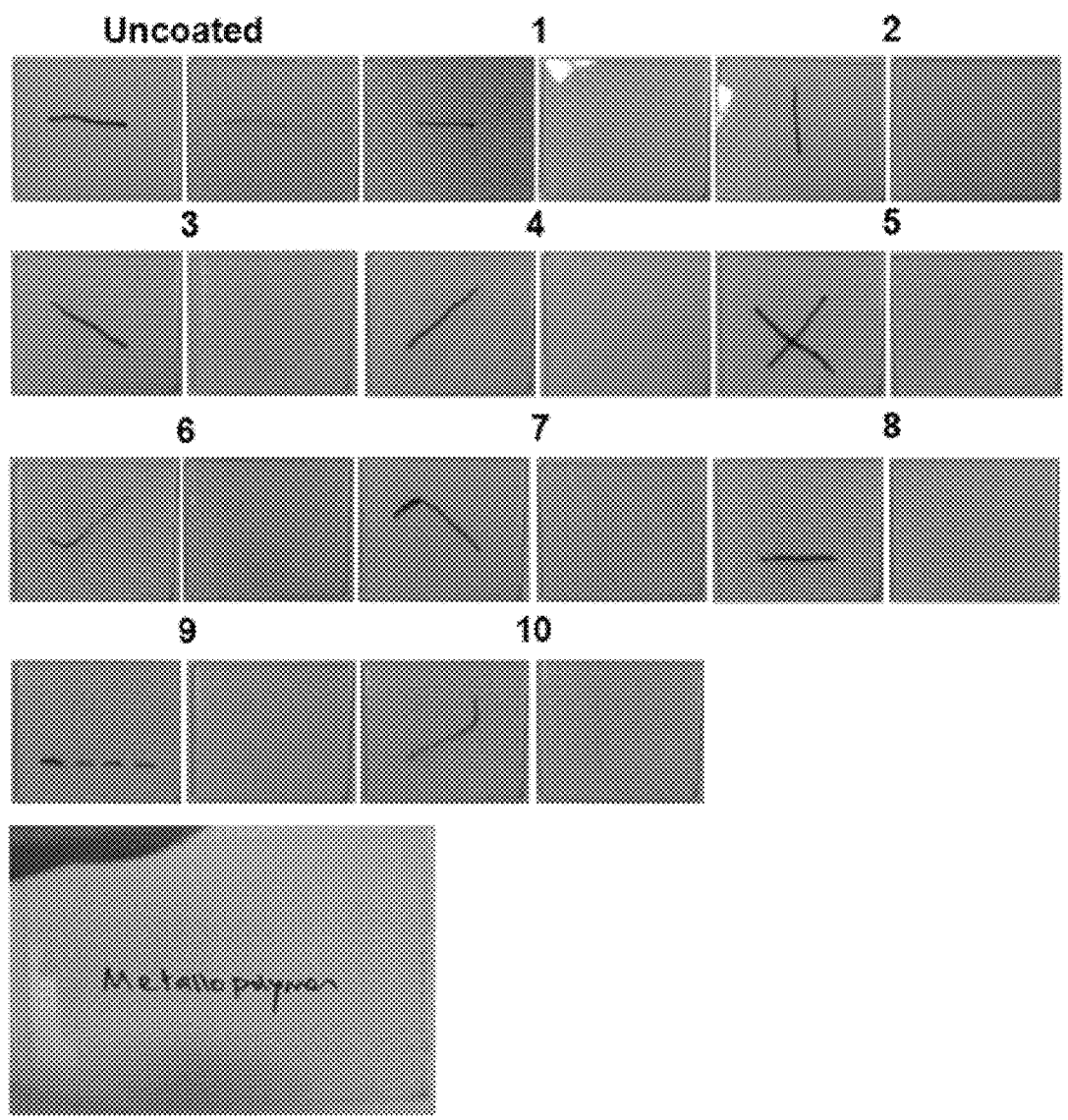

【Fig. 16】
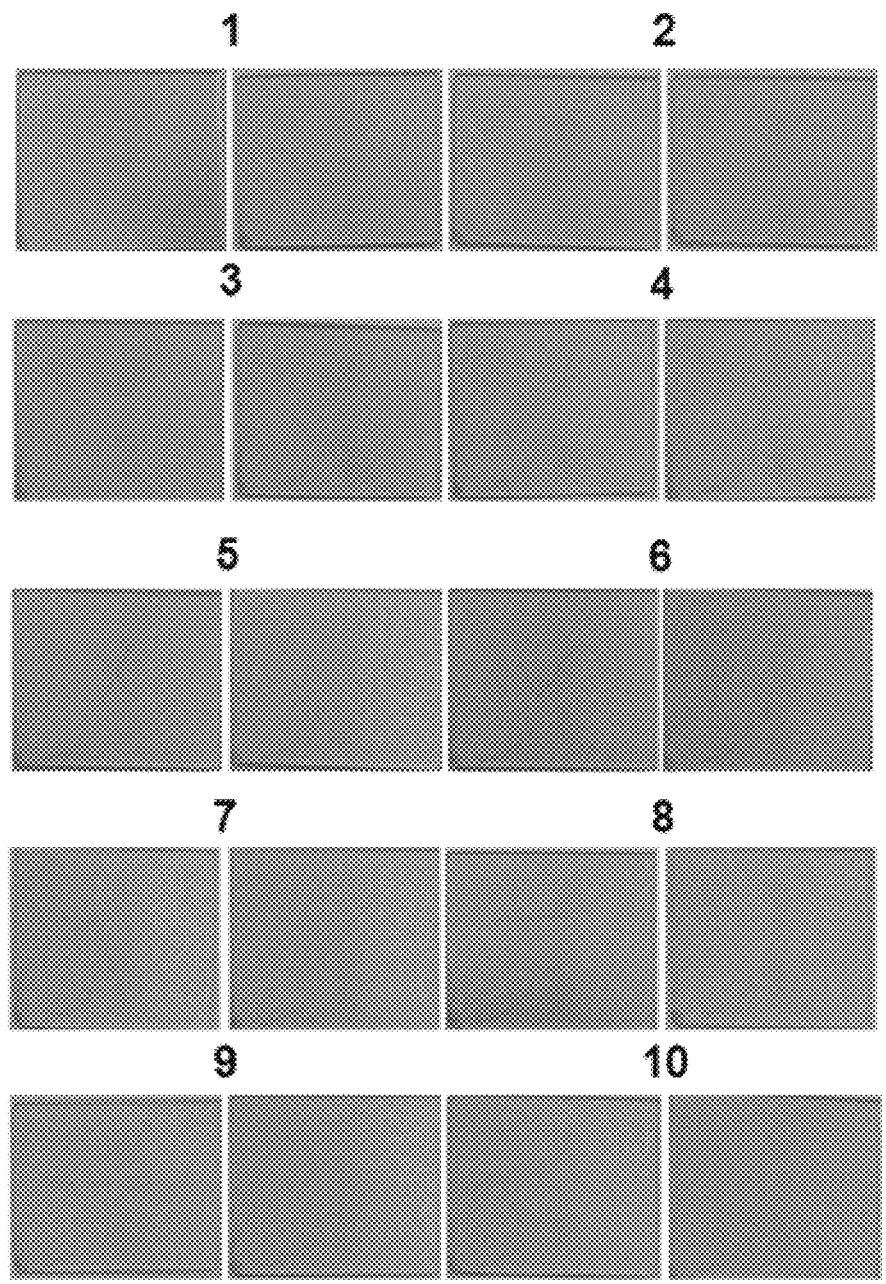

[Fig. 17]
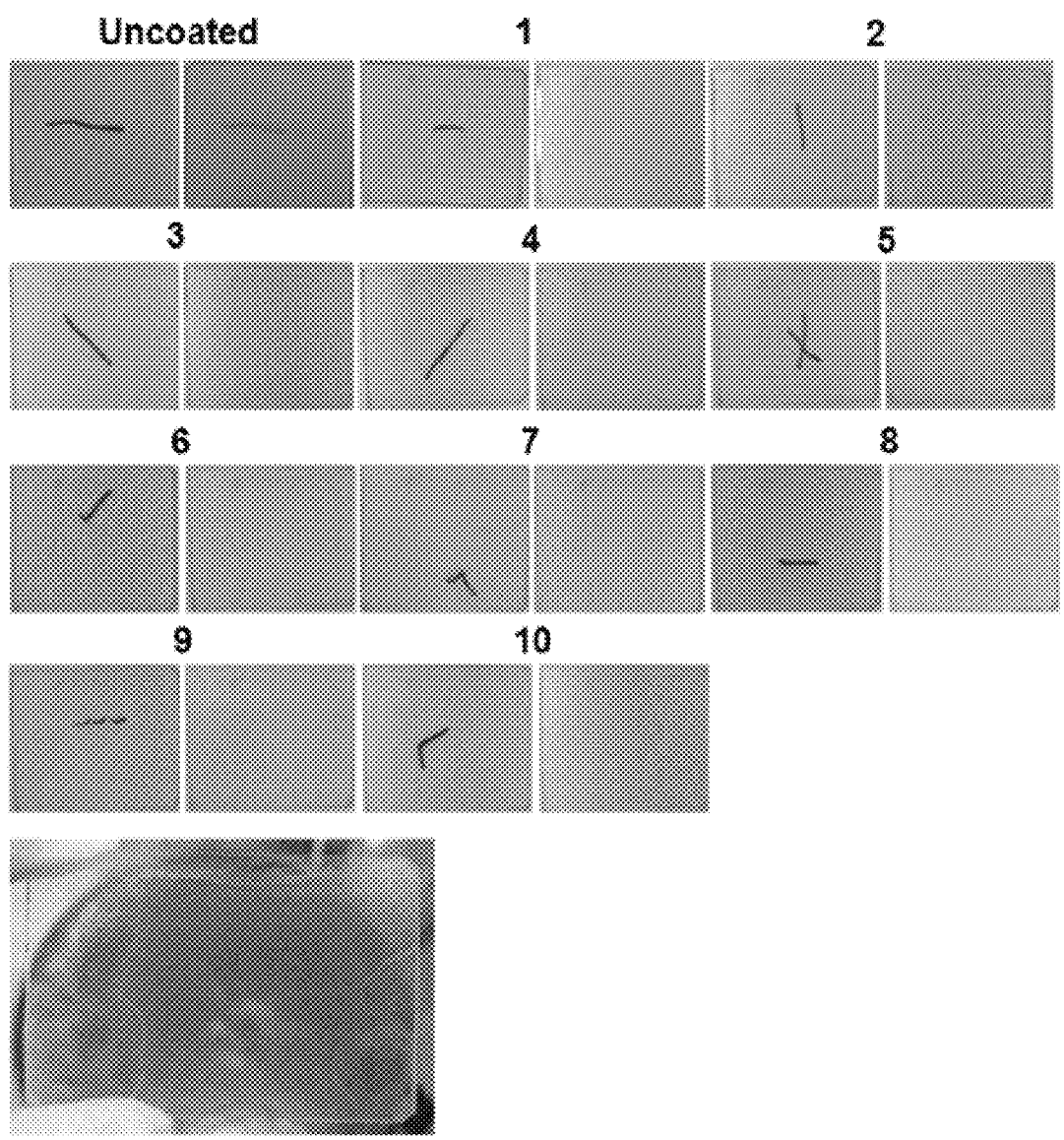

PVC-BASED METALLOPOLYMER NANOCOMPOSITES, AND COATING COMPOSITION AND COATING FILM COMPRISING SAME

CROSS REFERENCE TO RELATED APPLICATIONS

This application is a National Stage of PCT International patent application no. PCT/KR2013/007535 filed 22 Aug. 2013 which claimed priority in Korean patent application no. 10-2012-0092005 filed 22 Aug. 2012, the contents of these documents being hereby incorporated by reference herein.

TECHNICAL FIELD

The present invention relates to a PVC-based metallopolymer nanocomposite and a metallopolymer nanocomposite prepared by surface modification of the PVC-based metallopolymer nanocomposite with silica.

BACKGROUND

Recently, metallopolymer nanocomposites prepared from synthetic polymers with metal centers have received attention as next generation hybrid materials. Such metallopolymer nanocomposites contain typical elements (main group elements), transition elements (transition metal elements) or rare earth elements as central elements and may have various structures depending on the central metals and linkages, for example, depending on whether the central metals are introduced into the backbones or side chains of the polymers or are linear or branched. Polymers have easy-to-control mechanical properties and good formability compared to inorganic materials. Accordingly, metallopolymer nanocomposites can be imparted with various functions by strict design of the chemical structure of the polymers.

Poly(vinyl chloride) (PVC) is the most widely used polymeric material except for polyethylene and polypropylene. PVC is highly compatible in terms of mechanical properties and processability and can be useful in a range of applications, such as insulators and flame retardants. Particularly, PVC is widely used in construction applications because it is easy to process and cheap. The production of PVC in Korea is estimated to be 400 thousand tons in 2016. However, PVC has some drawbacks owing to its low thermal stability and strength. The presence of labile chlorines and internal allyl chlorides reduces the thermal stability of PVC.

In view of this situation, the present inventors have undertaken extensive studies to overcome the above drawbacks, and as a result, found that when a nucleophilic thiol having mercapto functional groups is introduced in PVC, a PVC-based metallopolymer nanocomposite can be prepared with improved economic efficiency and compatibility and can be used in various applications due to its high thermal stability. The present invention has been achieved based on this finding.

SUMMARY OF THE INVENTION

It is, therefore, an object of the present invention to provide a PVC-based metallopolymer nanocomposite.

It is a further object of the present invention to provide a superhydrophobic coating composition including the PVC-based metallopolymer nanocomposite.

It is another object of the present invention to provide a metallopolymer nanocomposite that is prepared by surface modification of the PVC-based metallopolymer nanocomposite to achieve improved mechanical strength.

It is another object of the present invention to provide anti-fouling coating compositions including the metallopolymer nanocomposites.

It is still another object of the present invention to provide anti-fouling coatings formed by applying the anti-fouling coating compositions to substrates.

According to one aspect of the present invention, there is provided a PVC-based metallopolymer nanocomposite including a core-forming metal ion, a nucleophilic thiol having three mercapto functional groups, and poly(vinyl chloride) (PVC).

According to a further aspect of the present invention, there is provided a superhydrophobic coating composition including the PVC-based metallopolymer nanocomposite.

According to another aspect of the present invention, there is provided a metallopolymer nanocomposite surface modified with silica that is prepared by grafting the PVC-based metallopolymer nanocomposite with a silane compound.

According to another aspect of the present invention, there is provided an anti-fouling coating composition including the modified metallopolymer nanocomposite.

According to yet another aspect of the present invention, there is provided an anti-fouling coating formed by applying the anti-fouling coating composition to a substrate.

The metallopolymer nanocomposites of the present invention use PVC and include a nucleophilic thiol having mercapto functional groups introduced in the PVC, achieving high thermal stability. In addition, the metallopolymer nanocomposites exhibit superhydrophobic properties due to their structures and are highly thermally stable. Therefore, the metallopolymer nanocomposites can be used to prepare superhydrophobic coating compositions useful in a range of applications.

Furthermore, the metallopolymer nanocomposite surface modified with silica using a silane compound is highly thermally stable and has improved mechanical strength. The metallopolymer nanocomposite surface modified with silica exhibits excellent anti-fouling properties as well as very high mechanical strength when compared to conventional PVC films.

BRIEF DESCRIPTION OF THE DRAWINGS

FIG. 1 shows a process for preparing a surface-modified metallopolymer nanocomposite according to one embodiment of the present invention.

FIGS. 2(*a*) and 2(*b*) show the states of PVCFeS and PVCFeS—SiSH metallopolymer solutions prepared in Examples 1 and 2, respectively, which were monitored at various time intervals, specifically, 0 days, 1 week, 2 weeks, 3 weeks, 4 weeks, 5 weeks and 6 weeks.

FIG. 3 shows FTIR spectra of PVC and materials used and prepared in Examples 1-3.

FIG. 4 shows FTIR spectra of materials used and prepared in Examples 1-3.

FIG. 5 shows UV-visible spectra of metallopolymer solutions, which were measured in the wavelength range of 200 to 450 nm.

FIG. 6 shows UV-visible spectra of PVCFeS metallopolymer solutions prepared in Example 2 for different time intervals.

FIGS. 7(a) through 7(g) show scanning electron microscopy (SEM) images of materials used and prepared in Examples 1-3 specifically, 7(a) PVC polymer, 7(b) Fe (III) in toluene, 7(c) TMSH monomer, 7(d) FeSH precursor prepared by the reaction of the TMSH monomer and the FeSH solution at 80° C. for 24 h, 7(e-g) show surface morphologies of the metallopolymer after curing at room temperature 7(e), 40° C. 7(f), and 80° C. 7(g), FIG. 7(h) showing a PVCFeS metallopolymer: porous membrane structure, 7(i) PVCFeS—SHSi and 7(j) PVCFeS-MeSi metallopolymers.

FIG. 8 shows UV-visible transmittance spectra of metallopolymer solutions spin coated on glass substrates and cured at room temperature and higher temperatures for various times.

FIGS. 9(a)-9(m) show-optical images of metallopolymer solutions spin coated on glass substrates and cured at room temperature and higher temperatures for various times, specifically, 9(a) PVC at room temperature, 24 h, 9(b) 80° C., 24 h, and 9(c) 150° C., 24 h, 9(d-k) PVCFeS metallopolymer, 9(d) at room temperature, 1 h, 9(e) 40° C., 1 h, 9(f) 80° C., 1 h, 9(g) 80° C., 24 h, 9(h) 100° C., 1 h, 9(i) 100° C., 7 h, 9(j) 120° C., 1 h, 9(k) 150° C., 30 min, 9(l) PVCFeS—SHSi metallopolymer (150° C., 24 h), and 9(m) PVCFeS-MeSi metallopolymer (150° C., 24 h).

FIG. 10 shows UV-visible transmittance spectra of a PVCFeS metallopolymer before and after curing and before and after washing with distilled water.

FIG. 11 shows the static contact angles of PVC, a PVCFeS metallopolymer, and a silica-modified metallopolymer for water.

FIGS. 12(a)-12(f) show static contact angle images of PVCFeS, PVCFeS—SiSH, and PVCFeS—SiMe metallopolymers for water and methyl iodide, specifically static contact angle images of PVCFeS (12(a)), PVCFeS—SiSH (12(b)), and PVCFeS—SiMe (12(c)) metallopolymers for water and of PVCFeS (12(d)), PVCFeS—SiSH (12(e)), and PVCFeS—SiMe (12(f)) metallopolymers for methyl iodide when cured at 150 C for 24 h.

FIG. 13 shows the static contact angles of a PVC film and a PVC metallopolymer for water before and after washing with distilled water.

FIG. 14 shows the static contact angles of a PVCFeS metallopolymer and silica-modified metallopolymers for water and soybean oil.

FIGS. 15, 16, and 17 show the anti-fouling properties of modified metallopolymers, specifically, FIG. 15 shows the results of a writing and erasing test using an oil based pen and ethanol, respectively, the test performed on an uncoated glass substrate and repeated 10 times on a coated glass substrate, FIG. 16 performed on the metallopolymer using a water based pen and water, respectively, the test repeated 10 times, and FIG. 17 performed on an uncoated glass substrate and the PVCFeS-MeSi metallopolymer coated on a glass substrate and cured at 150° C. for 24 h, with an oil based pen and erasing with ethanol, the test repeated 10 times.

DETAILED DESCRIPTION OF THE INVENTION

The present invention will now be described in detail.

In one aspect, the present invention is directed to a PVC-based metallopolymer nanocomposite including a core-forming metal ion, a nucleophilic thiol having three mercapto functional groups, and poly(vinyl chloride) (PVC). In the PVC-based metallopolymer nanocomposite, two of the mercapto functional groups of the nucleophilic thiol are coordinated to the metal ion and the other mercapto functional group is hybridized with the PVC by chlorine substitution. Due to this structure, the PVC-based metallopolymer nanocomposite can find application in various fields and has markedly improved thermal stability.

Preferably, the metal ion is selected from the group consisting of $Fe^{2+}$, $Ru^{2+}$, $Cu^0$, $Cu^{1+}$, $Cu^{2+}$, $Cr^{2+}$, $Cr^{3+}$, $Mo^0$, $Mo^{1+}$, $Mo^{2+}$, $Mo^{3+}$, $W^{2+}$, $W^{3+}$, $Rh^{3+}$, $Rh^{4+}$, $Co^{1+}$, $Co^{2+}$, $Re^{2+}$, $Re^{3+}$, $Ni^0$, $Ni^{1+}$, $Mn^{3+}$, $Mn^{4+}$, $V^{2+}$, $V^{3+}$, $Zn^{1+}$, $Zn^{2+}$, $Au^{1+}$, $Au^{2+}$, $Ag^{1+}$, and $Ag^{2+}$.

Preferably, the nucleophilic thiol is the compound of Formula 1:

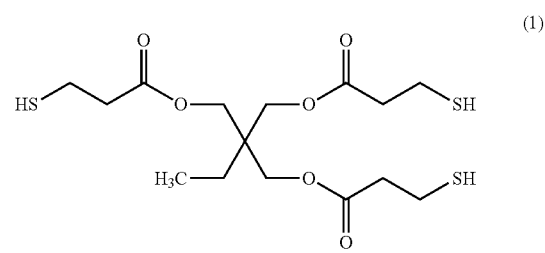 [SMILES: CCC(COC(=O)CCS)(COC(=O)CCS)COC(=O)CCS]

(1)

Preferably, the PVC-based metallopolymer nanocomposite is a compound represented by Formula 2:

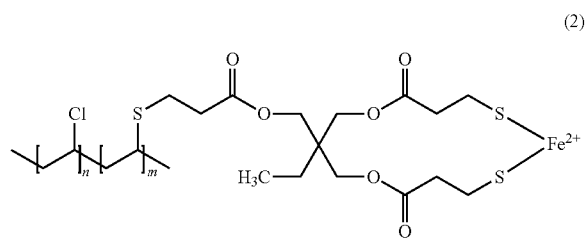

(2)

In a further aspect, the present invention is directed to a superhydrophobic coating composition including the PVC-based metallopolymer nanocomposite.

In another aspect, the present invention is directed to a metallopolymer nanocomposite surface modified with silica that is prepared by grafting the PVC-based metallopolymer nanocomposite with a silane compound. The surface modified metallopolymer nanocomposite has high thermal stability. In addition, the surface modification greatly improves the mechanical strength of the metallopolymer nanocomposite.

Preferably, the silane compound is (3-mercaptopropyl) trimethoxysilane or methyltrimethoxysilane.

In another aspect, the present invention is directed to an anti-fouling coating composition including the metallopolymer nanocomposite surface modified with silica.

In yet another aspect, the present invention is directed to an anti-fouling coating formed by applying the anti-fouling coating composition to a substrate.

Preferably, the substrate has a shape selected from powers, flakes, beads, balls, fibers, films, sheets, chips, rods, wires, and whiskers.

Preferably, the substrate is made of a material selected from: plastics including polyimide (PI), polyethylene terephthalate (PET), polyethylene naphthalate (PEN), polyethersulfone (PES), nylon, polytetrafluoroethylene (PTFE), polyether ether ketone (PEEK), polycarbonate (PC), and polyarylate (PAR); resins including acrylic resins, urethane resins, fluorine resins, silicon epoxy resins, and vinyl resins; rubbers including butyl rubbers, chloroprene rubbers, SBR rubbers, EPR rubbers, and SIS rubbers; ceramic materials including silica, alumina, titanium oxide, clay, stone, talc, and mica; metallic and alloy materials including aluminum, copper, nickel, iron, zinc, and brass; nonmetallic materials including carbon, silicon, and sulfur; metal salt compounds including salt and barium sulfate; papers including synthetic papers, photographic papers, wrapping papers, and corrugated papers; and composites thereof.

Preferably, the application is performed by at least one technique selected from spin coating, casting, roll coating, spray coating, dip coating, flow coating, doctor blading, dispensing, inkjet printing, offset printing, screen printing, pad printing, gravure printing, flexographic printing, stencil printing, imprinting, xerography, lithography, fluidized bed coating, atomic layer deposition (ALD), chemical vapor deposition (CVD), physical vapor deposition (PVD), ion plasma coating, electrostatic coating, and electrodeposition. Spin coating or casting is most preferred.

The present invention will be explained in detail with reference to the following examples. However, these examples do not serve to limit the scope of the invention.

[Example 1] Preparation of Iron (II) Mercaptopropionate (FeSH) Precursor 0.1081 g (0.4 mmol) of $FeCl_3.6H_2O$ was dissolved in 5.0 mL of double distilled water and 0.2558 g of TOAB as a phase transfer catalyst was dissolved in 10 mL of distilled water. The two separate solutions were combined in a flask and stirred at 1100 rpm under $N_2$ purge for 15 min until phase separation occurred. The yellow organic layer was separated from the aqueous phase, transferred to another flask, and cooled to 0° C. under $N_2$ purge.

0.4787 g (1.2 mmol) of TMSH was added to the solution and stirred at 100 rpm for 24 h. An immediate color change was observed from yellow to green upon the addition of TMSH to the organic phase, indicating the conversion of Fe (III) to Fe (II). After stirring for 24 h, the solution was later changed to greenish-yellow. This solution is called an iron (II) mercaptopropionate (FeSH) precursor, simply "FeSH precursor".

[Example 2] Preparation of PVCFeS Metallopolymer Composite 1.0 g of PVC was dissolved in 19.0 g of purified THF as a solvent at 40° C. and 0.5528 g of anhydrous $K_2CO_3$ was dissolved in 1.0 g of double distilled water. The aqueous $K_2CO_3$ solution was added to the PVC solution and stirred at 40° C. for 3 h. The color of the transparent solution was changed immediately to scarlet red upon the addition of the FeSH solution (1 g), but finally to pale yellow as the reaction was continued for 24 h. A small amount of aqueous solution produced at the bottom was removed. The resulting pale yellow organic solution is called a "PVCFeS metallopolymer".

[Example 3] Preparation of PVCFeS Metallopolymer Composite Surface Modified with Silica 0.5000 g of the PVCFeS metallopolymer solution was added to a 20 ml glass container. The solution was diluted with 5 ml of purified THF, followed by the addition of 0.05 phr of (3-mercaptopropyl)trimethoxysilane (MPTMS) to the PVCFeS solution with 0.1 g of aqueous $NH_3$ and 0.1 g of distilled water. The resulting solution was stirred vigorously for 24 h at room temperature. The solution is called a "PVCFeS—SHSi" metallopolymer.

A solution was prepared in the same manner as above except that 0.01 phr of MTMS was used instead of MPTMS. The solution is called a "PVCFeS-MeSi metallopolymer".

The full preparation process of Examples 1-3 is shown in FIG. 1.

Metallopolymer composites surface modified with silica were prepared in the same manner as in Examples 1-3, except that MPTMS and MTMS were used in various amounts (0.01, 0.1, and 0.2 phr for MPTMS, 0.05, 0.1, and 0.2 phr for MTMS). Each solution was spin coated on a glass substrate at 1000 rpm for 60 s, cured at 80° C. and 150° C. for 24 h, and evaluated for mechanical strength and antifouling properties.

The results will be explained with reference to the accompanying drawings.

FIG. 1 shows a process for preparing the PVCFeS metallopolymer and the PCVFeS—SHSi metallopolymer surface modified with silica.

FIG. 2 shows the stability of the solutions monitored at various time intervals: (a) presents optical images of the PVCFeS metallopolymer during storage for 6 weeks. No changes were observed in the color and concentration of the solution after 6 weeks, demonstrating superior stability of the metallopolymer; and (b) presents optical images of the PVCFeS—SHSi metallopolymer during storage for 4 weeks. No changes were observed in the color and concentration of the solution after 4 weeks, demonstrating very superior stability of the metallopolymer.

FIG. 3 shows FTIR spectra of the materials used and prepared in Examples 1-3.

FIG. 3(a) PVC powder 2969, 2911, and 2846 $cm^{-1}$: $—CH_2$ asymmetric stretching and weak symmetric stretching peaks of PVC 690 and 607 $cm^{-1}$: the presence of chlorine chain in the PVC backbone 1430-961 $cm^{-1}$: $—CH_2$ and $—CH$ stretching and bending modes of PVC.

FIG. 3(b) TMSH monomer 2567 and 1732 $cm^{-1}$: the presence of S—H and C=O functional groups of the mercapto monomer 2967 $cm^{-1}$: $—CH_2$ asymmetric stretching peak FIG. 3(c) Fe (III) in toluene: No particular peak was shown FIG. 3(d) FeSH precursor: A decrease in peak intensity for the SH functional group was observed at 2554 $cm^{-1}$ after reacting Fe (III) with TMSH. This indicates the reaction of Fe (III) ions with SH groups.

1732 $cm^{-1}$: the presence of a strong carbonyl peak, clearly showing the reaction process.

FIG. 3(e) PVCFeS metallopolymer: when the FeSH precursor was added to PVC, the peak due to the S—H group disappeared completely for the TMSH monomer. This clearly shows the complete reaction in metallopolymer preparation.

FIG. 3(f) PVCFeS—SHSi metallopolymer

2554 $cm^{-1}$: S—H group reappeared.

1121, 1051, and 467 $cm^{-1}$: Si—O—Si peaks.

918, 1257, and 802 $cm^{-1}$: Si—OH and $CH_2$ groups in mercaptopropyl silica. This suggests that the mercapto silica functional group reacts with the PVCFeS metallopolymer.

FIG. 3(g) PVCFeS-MeSi metallopolymer: peaks similar to those of the PVCFeS—SHSi metallopolymer except for the S—H peak were shown.

FIG. 4 shows FTIR spectra of the FeSH precursor (a), the PVCFeS (after reaction for 24 h) (b), the PVCFeS—SHSi metallopolymer (c), and the PVCFeS-MeSi metallopolymer (d). The spectra revealed the reduction, disappearance and reappearance of the S—H peak at 2567 cm$^{-1}$, confirming that the reaction proceeded well.

FIG. 5 shows UV-visible spectra of the following materials, which were measured in the wavelength range of 200 to 450 nm.

(a) THF solvent
(b) PVC in THF
(c) Fe (III) in water
(d) Fe (III) in toluene
(e) TMSH
(f) FeSH
(g) PVCFeS after reaction for 30 min
(h-j) PVCFeS after reaction for 6, 12, and 24 h
(k,l) PVCFeS—SHSi and PVCFeS-MeSi metallopolymer solutions after reaction for 24 h The THF solvent (a) as a control showed no absorption peaks and was linear, whereas the solution of PVC in THF (b) showed a sharp peak at 216 nm and weak peaks at 203, 206, 208, 232, 236, 253, and 260 nm. The solution of Fe (III) in distilled water (c) showed broad peaks at 212-250 nm and 310-370 nm. The solution of Fe (III) in toluene (d) was phase separated from the toluene-water mixture solution. For the solution (d), broad UV absorption peaks shifted to 212-278 nm and two new broad peaks appeared at 290-340 nm and 345-410 nm. For the TMSH monomer (e), a strong peak appeared at 235 nm. For the FeSH precursor (f) prepared by the reaction of the TMSH monomer and the Fe (III) solution in toluene, a broad band was shown in the range of 215-275 nm. Weak broad bands shifted to the ranges of 290-340 nm and 345-410 nm were observed because Fe (III) was reduced to Fe (II) by the mercapto functional groups. For PVCFeS after reaction for 30 min (g), the two broad bands of the FeSH precursor disappeared completely in the peaks of the PVCFeS metallopolymer and a new peak at 336 nm started to appear with increasing reaction time. This is due to the complete reaction of PVC with the mercapto functional groups present in the TMSH monomer. For PVCFeS after reaction for 6, 12, and 24 h (h-j), the sharp peak shifted to 220, 257, 263, and 270 nm and the weak peaks appeared at 204 and 208 nm with increasing reaction time. As the reaction proceeded, a slight increase in the intensity of the sharp peak at 220 nm and a slight shift of the peak to 224 nm were observed. Other strong peaks appeared at 253, 257, 263, 270, and 336 nm, which slightly increased with increasing reaction time. For the PVCFeS—SHSi metallopolymer (k), a sharp peak was also observed at 235 nm and the intensity of the peak at 336 nm decreased. For the PVCFeS-MeSi metallopolymer (l), strong peaks were observed at 253, 263, and 270 nm and the peak at 336 nm disappeared completely.

FIG. 6 shows UV-visible spectra of the prepared PVCFeS metallopolymer solutions for different time intervals: (a) 30 min, (b) 1 h, (c) 2 h, (d) 3 h, (e) 4 h, (f) 5 h, (g) 6 h, (h) 10 h, (i) 12 h, and (j) 24 h. The results clearly show that the reaction proceeded gradually for 24 h.

FIG. 7 shows scanning electron microscopy (SEM) images of the following materials.

FIG. 7(a) PVC polymer: the spin coated PVC showed a smooth surface morphology with some fractures on the surface.

FIG. 7(b) Fe (III) in toluene: this material formed a micro-sized roughness on a glass substrate.

FIG. 7(c) TMSH monomer: this material showed particles well dispersed on the surface with uniform sizes in the range of 50-75 nm.

FIG. 7(d) FeSH precursor prepared by the reaction of the TMSH monomer and the FeSH solution at 80° C. for 24 h: the particle size increased slightly. This is attributed to the chemical polymerization of TMSH and Fe (III) ions. The particles had an increased diameter of ~200 nm.

FIG. 7(e-g) Surface morphologies of the metallopolymer after curing at (e) room temperature, (f) 40° C., and (g) 80° C.: as a result of the reaction of the FeSH precursor and PVC, this material had a smooth layered structure and was composed of some particles applied over the entire surface thereof. The surface morphology of the material was changed from the fractured shape to layered networks with increasing curing temperature.

FIG. 7(h) PVCFeS metallopolymer: porous membrane structure

FIG. 7(i, j) PVCFeS—SHSi and PVCFeS-MeSi metallopolymers: as a result of curing at 80° C. for 24 h, porous silica particles were produced on the surfaces.

FIG. 8 shows UV-visible transmittance spectra of the metallopolymer solutions spin coated on glass substrates and cured at room temperature and higher temperatures for various times:

FIG. 8(a) PVC, (b) PVCFeS (room temperature), (c) PVCFeS (40° C., 1 h), (d) PVCFeS (80° C., 1 h), (e) PVCFeS (100° C., 1 h), (f) PVCFeS (100° C., 7 h), (g) PVCFeS (120° C., 1 h), (h) PVCFeS (150° C., 30 min), (i,j) PVCFeS—SHSi and PVCFeS-MeSi metallopolymers (150° C., 24 h).

The spin-coated PVC film had a transmittance of 98.0% and PVCFeS cured at room temperature had a transmittance of 95.5%. However, when the curing temperature was increased from room temperature to 150° C., the coated metallopolymer maintained transparency up to 80° C. and thereafter its transparency was decreased gradually. This is attributed to the decomposition of the metallopolymer at the higher temperatures. When the curing temperature increased to 150° C., the transparent substrate was changed to dark brownish and its transparency was further reduced to 6.5% within 30 min. This is because the metallopolymer chain was decomposed slightly.

In contrast, the surface modified metallopolymers prepared by reaction with MPTMS and MTMS were confirmed to have higher transmittances even when cured at 150° C. for 24 h.

FIG. 9 shows optical images of the metallopolymer solutions spin coated on glass substrates and cured at room temperature and higher temperatures for various times:

FIG. 9(a-c) PVC, (a) room temperature, 24 h, (b) 80° C., 24 h, and (c) 150° C., 24 h, (d-k) PVCFeS metallopolymer, (d) room temperature, 1 h, (e) 40° C., 1 h, (f) 80° C., 1 h, (g) 80° C., 24 h, (h) 100° C., 1 h, (i) 100° C., 7 h, (j) 120° C., 1 h, (k) 150° C., 30 min, (l) PVCFeS—SHSi metallopolymer (150° C., 24 h), (m) PVCFeS-MeSi metallopolymer (150° C., 24 h).

The surface modified metallopolymers prepared by reaction with MPTMS and MTMS (l, m) were confirmed to have higher transparency even when cured at 150° C. for 24 h, which are the same as the results of FIG. 8.

FIG. 10 shows UV-visible transmittance spectra of (a) background, (b) the PVC film (cured at 80° C.), (c, d) the PVCFeS metallopolymer cured at 40 and 80° C. before washing with distilled water, and (e, f) the PVCFeS metallopolymer cured at 40 and 80° C. after washing with distilled water.

FIG. 11 shows the static contact angles of PVC, the PVCFeS metallopolymer, and the silica-modified metallopolymer for water, which were measured after spin coating and curing at 80° C. and 150° C. for 24.

The spin coated PVC surface showed good hydrophobic properties to water with a contact angle of 111.12°±6.0° at 80° C. The spin coated PVC surface had a slightly reduced contact angle of 107.26°±2.0° after curing at 150° C. but still remained hydrophobic. This is attributed to slight melting of the PVC polymer at the higher temperature. The TMSH monomer showed hydrophilic properties (62.84°±3.0°) when cured at 150° C.

The phase separated Fe (III) solution exhibited almost hydrophobic properties: static contact angles for water of 84.90°±2.0 at 80° C., which increased slightly (85.66°±2.0) at 150° C.

The FeSH solution exhibited hydrophobic behavior (93.90°±2.0°) for water at 80° C., which decreased slightly (82.23°±3.0°) at 150° C.

The static contact angles of the PVCFeS metallopolymer prepared by the reaction of PVC and the FeSH precursor were 142.65°±3.0° and 143.27°±2.0° for water when cured at 80° C. and 150° C., respectively, which almost correspond to superhydrophobic properties.

The static contact angles of the silica-modified metallopolymer for water were 113.98°±1.0° and 112.20°±5.0° when cured at 80° C. and 150° C., respectively, which correspond to hydrophobic properties. This change in hydrophobicity before and after silica modification is due to the presence of a hydrophilic S—H functional group at the chain end, whereas the methyl silica-modified metallopolymer also produced the same type of hydrophobic behavior on the coated substrate.

The oil resistivities of the spin coated materials were tested with methyl iodide. The PVC polymer, the TMSH monomer, Fe (III) in toluene, and the FeSH precursor showed oleophilicity to MI after curing at 80° C. The contact angle increased with increasing curing temperature to 150° C. The PVCFeS metallopolymer showed excellent oleophobicity at both curing temperatures. The modified metallopolymer exhibited oleophilic to partially oleophobic properties to methyl iodide and soybean oil.

FIG. 12 shows static contact angle images of PVCFeS, PVCFeS—SiSH, and PVCFeS—SiMe metallopolymers for water (a-c) and for methyl iodide (d-f) when cured at 150 C for 24 h.

FIG. 13 shows the static contact angles of the PVC film and the PVC metallopolymer for water before and after washing with distilled water.

FIG. 14 shows the static contact angles of the PVCFeS metallopolymer and the silica-modified metallopolymers for water and soybean oil.

FIGS. 15, 16, and 17 show the anti-fouling properties of the modified metallopolymers.

FIGS. 15 and 16 show the anti-fouling properties of the PVCFeS—SHSi metallopolymer coated on glass substrates and cured at 150° C. for 24 h. Specifically, FIG. 15 shows the anti-fouling properties of the metallopolymer measured from a writing and erasing test using an oil based pen and ethanol, respectively. The test was repeated 10 times. FIG. 16 shows the anti-fouling properties of the metallopolymer measured from a writing and erasing test using a water based pen and water, respectively. The test was repeated 10 times. FIG. 17 shows the anti-fouling properties of the PVCFeS-MeSi metallopolymer coated on a glass substrate and cured at 150° C. for 24 h, which were measured by repeating a writing (with an oil based pen) and erasing (with ethanol) test 10 times.

Oil based pens marks on the uncoated glass substrate clearly remained and were not erased (see "Uncoated" in FIGS. 15 and 17). When compared with FIGS. 9 (a) and (b), no marks were left on the surface of the PVCFeS—SHSi metallopolymer despite 10 times of writing with both oil and water based pens and erasing with ethanol and the transparent state of the metallopolymer was maintained, demonstrating excellent anti-fouling properties of the metallopolymer. No marks were left on the surface of the PVCFeS-MeSi metallopolymer despite the repeated writing and erasing with an oil based pen and ethanol, respectively, demonstrating excellent anti-fouling properties of the metallopolymer. Referring to FIG. 16, the superhydrophobic coating was not readily marked with a water based pen. The results of FIGS. 15 to 17 indicate excellent anti-fouling properties and superior mechanical strength of the metallopolymers.

[Experimental Example 1] Scratch Resistance Test

The scratch resistance of the metallopolymers was tested using a Yoshimitsu pencil hardness tester D-221 according to the ASTM method (ASTM D 3363-74). Specifically, each of the PVC polymer and PVCFeS, PVCFeS—SHSi, and PVCFeS-MeSi metallopolymers was spin coated on a glass substrate, cured at 80° C. and 150° C., and measured for pencil hardness.

The PVC polymer showed good adhesive properties to a glass substrate and less hardness. When the PVC polymer was tested with a HB pencil, scratches remained, indicating very low hardness of the PVC polymer. The PVCFeS metallopolymer sample cured at 80° C. failed to reach F pencil hardness and showed very low mechanical strength. The PVCFeS metallopolymer sample cured at a higher temperature of 150° C. also failed to reach F pencil hardness but was found to have further improved scratch resistance.

These results show that the PVCFeS metallopolymer has very low mechanical strength.

The surface modification with the silica monomer was found to enhance the mechanical strength (scratch resistance). When the PVCFeS—SHSi metallopolymer surface modified with the MPTMS monomer was spin coated on a glass substrate and cured at 80° C., it showed improved scratch resistance (3 H). When the curing temperature was increased to 150° C., the scratch resistance was dramatically enhanced (above 8 H). This is believed to be due to the enhanced adhesive properties of the metallopolymer to the glass substrate at 150° C. The PVCFeS-MeSi metallopolymer surface modified with the MTMS monomer showed a pencil hardness of 1 H when cured at 80° C., which increased to 4 H when cured at 150° C. Also in this case, the scratch resistance of the metallopolymer surface was improved by increasing the curing temperature.

The metallopolymer nanocomposite (PVCFeS metallopolymer) cured at 80° C. was highly transparent (85.7%), hydrophobic (142.65°±3.0°), and oleophobic (120.87°±2.2°). In contrast, the metallopolymer nanocomposite cured at 150° C. was less transparent (6.5%) and showed improved hydrophobic (143.27°±2.0°) and oleophobic properties (138.50°±3.0°). These results lead to the conclusion that the metallopolymer nanocomposite is highly thermally stable and has superhydrophobicity when coated.

However, the metallopolymer nanocomposite failed to reach F pencil hardness, indicating low strength. In contrast, the metallopolymer nanocomposites surface modified with silica (the PVCFeS—SHSi and PVCFeS-MeSi metallopolymers) showed transmittances of 87.0% and 67.5%, mechanical strengths of ≥8H and ≥4H, and contact angles for water of 112.20°±1.0° and 116.20°±2.0°, respectively. That is, the metallopolymer nanocomposites surface modified with silica can be used to form highly thermally stable, transparent, mechanically strong, and hydrophobic coatings.

Furthermore, from the writing and erasing test results using water and oil based pens, it could be confirmed that the PVCFeS—SHSi and PVCFeS-MeSi metallopolymers have excellent anti-fouling properties and high mechanical strength. Therefore, the use of the metallopolymer nanocomposites surface modified with silica enables the formation of coatings with excellent anti-fouling properties.

As is apparent from the foregoing, the PVC-based metallopolymer nanocomposite of the present invention is expected to find application in various fields due to its high economic efficiency and compatibility. Particularly, the surface modified metallopolymer nanocomposite of the present invention has the advantages of high thermal stability and improved mechanical strength. Due to these advantages, the surface modified metallopolymer nanocomposite of the present invention is expected to find applications where superhydrophobicity and anti-fouling properties are required.

The invention claimed is:

1. A PVC-based metallopolymer nanocomposite comprising a core-forming metal ion, a nucleophilic thiol having three mercapto functional groups, and poly(vinyl chloride) (PVC).

2. The PVC-based metallopolymer nanocomposite according to claim 1, wherein the metal ion is selected from the group consisting of $Fe^{2+}$, $Ru^{2+}$, $Cu^0$, $Cu^{1+}$, $Cu^{2+}$, $Cr^{2+}$, $Cr^{3+}$, $Mo^0$, $Mo^{1+}$, $Mo^{2+}$, $Mo^{3+}$, $W^{2+}$, $W^{3+}$, $Rh^{3+}$, $Rh^{4+}$, $Co^{1+}$, $Co^{2+}$, $Re^{2+}$, $Re^{3+}$, $Ni^0$, $Ni^{1+}$, $Mn^{3+}$, $Mn^{4+}$, $V^{2+}$, $V^{3+}$, $Zn^{1+}$, $Zn^{2+}$, $Au^{1+}$, $Au^{2+}$, $Ag^{1+}$, and $Ag^{2+}$.

3. The PVC-based metallopolymer nanocomposite according to claim 1, wherein the nucleophilic thiol is the compound of Formula 1:

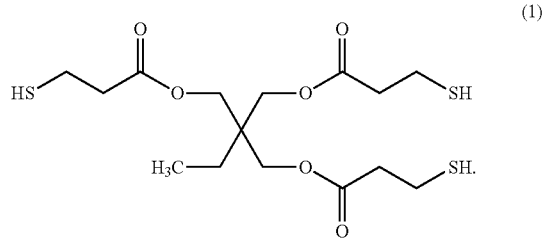 [SMILES: CCC(COC(=O)CCS)(COC(=O)CCS)COC(=O)CCS]

(1)

4. The PVC-based metallopolymer nanocomposite according to claim 3, wherein the PVC-based metallopolymer nanocomposite is a compound represented by Formula 2:

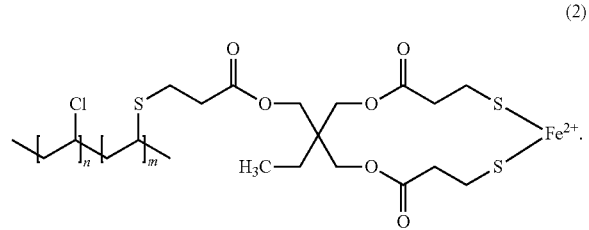

(2)

5. A superhydrophobic coating composition comprising the PVC-based metallopolymer nanocomposite according to claim 1.

6. A metallopolymer nanocomposite surface modified with silica that is prepared by grafting the PVC-based metallopolymer nanocomposite according to claim 1 with a silane compound.

7. The metallopolymer nanocomposite according to claim 6, wherein the silane compound is (3-mercaptopropyl)trimethoxysilane or methyltrimethoxysilane.

8. An anti-fouling coating composition comprising the metallopolymer nanocomposite surface modified with silica according to claim 6.

9. An anti-fouling coating formed by applying the anti-fouling coating composition according to claim 8 to a substrate.

10. The anti-fouling coating according to claim 9, wherein the substrate has a shape selected from powers, flakes, beads, balls, fibers, films, sheets, chips, rods, wires, and whiskers.

11. The anti-fouling coating according to claim 9, wherein the substrate is made of a material selected from: plastics comprising polyimide (PI), polyethylene terephthalate (PET), polyethylene naphthalate (PEN), polyethersulfone (PES), nylon, polytetrafluoroethylene (PTFE), polyether ether ketone (PEEK), polycarbonate (PC), and polyarylate (PAR); resins comprising acrylic resins, urethane resins, fluorine resins, silicon epoxy resins, and vinyl resins; rubbers comprising butyl rubbers, chloroprene rubbers, SBR rubbers, EPR rubbers, and SIS rubbers; ceramic materials comprising silica, alumina, titanium oxide, clay, stone, talc, and mica; metallic and alloy materials comprising aluminum, copper, nickel, iron, zinc, and brass; nonmetallic materials comprising carbon, silicon, and sulfur; metal salt compounds comprising salt and barium sulfate; papers comprising synthetic papers, photographic papers, wrapping papers, and corrugated papers; and composites thereof.

12. The anti-fouling coating according to claim 9, wherein the application is performed by at least one technique selected from spin coating, casting, roll coating, spray coating, dip coating, flow coating, doctor blading, dispensing, inkjet printing, offset printing, screen printing, pad printing, gravure printing, flexographic printing, stencil printing, imprinting, xerography, lithography, fluidized bed coating, atomic layer deposition (ALD), chemical vapor deposition (CVD), physical vapor deposition (PVD), ion plasma coating, electrostatic coating, and eletrodeposition.

13. A superhydrophobic coating composition comprising the PVC-based metallopolymer nanocomposite according to claim 2.

14. A superhydrophobic coating composition comprising the PVC-based metallopolymer nanocomposite according to claim 4.

15. A metallopolymer nanocomposite surface modified with silica that is prepared by grafting the PVC-based metallopolymer nanocomposite according to claim 2 with a silane compound.

16. A metallopolymer nanocomposite surface modified with silica that is prepared by grafting the PVC-based metallopolymer nanocomposite according to claim 4 with a silane compound.

17. An anti-fouling coating composition comprising the metallopolymer nanocomposite surface modified with silica according to claim 15.

18. An anti-fouling coating formed by applying the anti-fouling coating composition according to claim 17 to a substrate.

19. An anti-fouling coating composition comprising the metallopolymer nanocomposite surface modified with silica according to claim 16.

20. An anti-fouling coating formed by applying the anti-fouling coating composition according to claim 19 to a substrate.

* * * * *